(12) United States Patent
Jones et al.

(10) Patent No.: US 10,215,611 B2
(45) Date of Patent: Feb. 26, 2019

(54) APPARATUS AND METHOD FOR DETERMINING A LEVEL OF A FLUID WITHIN A VESSEL

(71) Applicant: JOHNSON MATTHEY PUBLIC LIMITED COMPANY, London (GB)

(72) Inventors: Owen John Lloyd Jones, Durham (GB); Francis O'Doherty, Durham (GB); Tor Magnus Saevareide, Bergen (NO)

(73) Assignee: Johnson Matthey Public Limited Company, London, England (GB)

( * ) Notice: Subject to any disclaimer, the term of this patent is extended or adjusted under 35 U.S.C. 154(b) by 130 days.

(21) Appl. No.: 15/517,068

(22) PCT Filed: Oct. 9, 2015

(86) PCT No.: PCT/GB2015/052962
§ 371 (c)(1),
(2) Date: Apr. 5, 2017

(87) PCT Pub. No.: WO2016/055803
PCT Pub. Date: Apr. 14, 2016

(65) Prior Publication Data
US 2017/0292869 A1 Oct. 12, 2017

(30) Foreign Application Priority Data

Oct. 10, 2014 (GB) .................................. 1417969.1

(51) Int. Cl.
G01F 23/292 (2006.01)
G01F 23/288 (2006.01)
(52) U.S. Cl.
CPC .......... G01F 23/292 (2013.01); G01F 23/288 (2013.01)

(58) Field of Classification Search
CPC ............................. G01F 23/292; G01F 23/288
See application file for complete search history.

(56) References Cited

U.S. PATENT DOCUMENTS 3,594,575 A * 7/1971 Shoemaker ......... G01F 23/2885
378/52
4,503,330 A 3/1985 Hearn
(Continued)

FOREIGN PATENT DOCUMENTS

GB 780 849 A 8/1957
GB 1503864 A 3/1978
(Continued)

OTHER PUBLICATIONS

International Search Report, dated Jan. 26, 2016, from corresponding PCT application.
(Continued)

Primary Examiner — Tony Ko
(74) Attorney, Agent, or Firm — Baker & Hostetler LLP

(57) ABSTRACT

An apparatus and method for determining a level of a fluid within a vessel are disclosed. The apparatus includes: a source unit for emitting a beam of radiation into the interior of the vessel, the source unit including a source of radiation and a collimator for collimating radiation emitted by the source to provide the beam, wherein the source unit is adjustable to vary an angle of the beam with respect to horizontal; at least one detector for detecting radiation emitted by the source and having passed through at least a portion of the interior of the vessel; and a processor for: recording data corresponding to an amount of radiation detected at the at least one detector as a function of angle of the beam; and determining the level of the fluid, based on a variation of the data with the angle of the beam.

20 Claims, 4 Drawing Sheets

(56) References Cited

U.S. PATENT DOCUMENTS

| | | | |
|---|---|---|---|
| 4,591,719 A | 5/1986 | Bonnemay | |
| 4,745,293 A | 5/1988 | Christensen | |
| 5,673,746 A | 10/1997 | Chun et al. | |
| 6,545,286 B1 | 4/2003 | Ross et al. | |
| 8,487,262 B2 * | 7/2013 | Damm | G01F 23/288 |
| | | | 250/357.1 |
| 9,158,007 B2 * | 10/2015 | Damm | G01F 23/288 |
| 2014/0353507 A1 * | 12/2014 | Glaser | G01F 23/288 |
| | | | 250/357.1 |

FOREIGN PATENT DOCUMENTS

| | | |
|---|---|---|
| JP | S63 241488 A | 10/1988 |
| JP | S63247623 A | 10/1988 |
| JP | H0566148 A | 3/1993 |
| JP | H05172611 A | 7/1993 |
| SU | 1719913 A1 | 3/1987 |
| WO | 2013/005011 A1 | 1/2013 |

OTHER PUBLICATIONS

GB Search Report, dated Jan. 22, 2015, from corresponding GB application.

GB Search Report, dated Feb. 15, 2016, from corresponding GB application.

* cited by examiner

APPARATUS AND METHOD FOR DETERMINING A LEVEL OF A FLUID WITHIN A VESSEL

The present invention relates to an apparatus and method for determining a level of a fluid within a vessel, and relates particularly, but not exclusively, to a method and apparatus for determining a level of a fluid within a vessel by detecting radiation which has passed through a portion of the vessel in which the fluid may be present.

It is known to use radiation to measure a level of a fluid in a vessel. For example WO 2013/005011 discloses a method and apparatus for determining the location of a phase boundary, such as a fill level, in a vessel.

However, the performance of existing apparatuses and methods is typically affected by the presence of varying levels of background radiation, for example due to nearby radiography or other non-destructive testing (NDT), or a change in build-up deposits on the vessel walls, particularly the build-up of radioactive material. Under such conditions, some known apparatuses are forced to shut down and stop proving level information. In addition, existing methods and apparatuses typically require onsite calibration by cycling the level of the tank.

Embodiments of the present invention seek to overcome one or more problems associated with the prior art.

According to a first aspect of the invention, there is provided an apparatus for determining a level of a fluid within a vessel, the apparatus comprising:

a source unit for emitting a beam of radiation into the interior of the vessel, the source unit comprising a source of radiation and a collimator for collimating radiation emitted by the source to provide said beam, wherein said source unit is adjustable to vary an angle of the beam with respect to horizontal;

at least one detector for detecting radiation emitted by the source and having passed through at least a portion of the interior of the vessel; and processing means for:
  recording data corresponding to an amount of radiation detected at said at least one detector as a function of angle of the beam; and
  determining the level of the fluid, based on a variation of said data with the angle of the beam.

By varying the angle of the beam with respect to the horizontal, and determining the level of the fluid based on a variation of data corresponding to an amount of radiation detected at the detector as a function of angle of the beam, the present invention allows continuous measurement of the fluid level in the vessel, even when background radiation levels are high and/or changing. This enables continuous measurement of fluid level in the tank, even when operating near to radiography or other forms of non-destructive testing. Furthermore, the present invention enables continuous measurement of fluid level even when there is build up on the interior walls of the vessel. It is not necessary to calibrate the apparatus by cycling the fluid level within the tank, enabling the apparatus to be installed without interrupting the operation of the vessel.

Said amount of radiation may be an amount of radiation, e.g. a number of counts, detected at the detector in a specified time period, or a rate of detection of radiation at the detector.

The level of the fluid may correspond to a boundary between two fluid phases, for example between two different liquids, two different gases, or a gas and a liquid.

The source unit may be adjustable by rotating the collimator to vary an angle of the beam. Preferably the collimator is rotated about the source.

The apparatus may comprise a motor for driving rotation of the collimator.

The motor may comprise an encoder for indicating an angle of the beam.

The collimator may comprise more than one slot for collimating radiation emitted by the source.

The slots may be arranged such that only one beam of radiation is emitted towards the detector at any one time. By providing more than one collimator slot, more than one beam of radiation may be swept successively across at least a part of the interior of the vessel during a single complete rotation of the collimator, thereby increasing the efficiency of operation of the apparatus.

The axis of rotation of the collimator may be centered substantially on the source.

This may simplify the design of the source unit.

The detector may comprise a plastic scintillator. The detector is preferably configured to be fixedly mounted on, in or near the vessel. Preferably the detector is an elongate detector and the source unit is adjustable to vary an angle of the beam such that the beam sweeps along the detector. The detector is preferably capable of recording high count rates, for example count rates of at least 1,000 cps, more preferably at least 10,000 cps, more preferably at least 100,000 cps and more preferably at least 1,000,000 cps. A high count rate detector may permit the detector to operate even when background radiation levels are high.

The level of the fluid may be determined based on an angle of the beam, with respect to the horizontal, corresponding to a maximum rate of change of said data with the angle of the beam.

Said maximum rate of change of said data may be a maximum rate of change as the beam enters or leaves the fluid, that is, as the beam crosses the level of the fluid within the vessel.

The level of the fluid may be determined to be located below the position of the beam, in its horizontal configuration, by a distance equal to a tan $\theta_{max}$, where a is the separation between the axis of rotation of the collimator and the detector, and $\theta_{max}$ is the angle of the beam relative to horizontal corresponding to said maximum rate of change of said data with angle of the beam.

Said processing means may be configured to:
(i) average the data over repeated measurements prior to determining the level of the fluid;
(ii) apply a Gaussian filter to the data prior to determining the level of the fluid; and/or
(iii) apply a Fourier filter to the data prior to determining the level of the fluid.

Averaging or filtering the data may improve the signal-to-noise ratio and improve the resilience of the apparatus to background radiation, in particular a fluctuating background, without increasing the source size or data collection time.

Said processing means may be configured to fit a smooth function to the data, prior to determining the level of the fluid based on an angle of the beam with respect to the horizontal corresponding to a maximum rate of change of said fitted function with the angle of the beam.

Fitting a smooth curve to the data may improve the resilience of the apparatus to noise on the data, particularly noise due to background radiation, without increasing the source size or data collection time.

In one embodiment the angle of the beam is stepped through a plurality of values.

In another embodiment the angle of the beam is varied continuously.

The source of radiation may comprise a source of gamma radiation.

According to another aspect of the invention, there is provided a method for determining a level of a fluid within a vessel, the method comprising the following steps:

providing a source unit for emitting a beam of radiation into the interior of a vessel, the source unit comprising a source of radiation and a collimator for collimating radiation emitted by the source to provide said beam;

providing a detector for detecting radiation emitted by the source and having passed through at least a portion of the interior of the vessel;

adjusting said source unit to vary an angle of the beam with respect to horizontal;

recording data corresponding to an amount of radiation detected at the detector as a function of angle of the beam; and determining the level of the fluid based on a variation of said data with the angle of the beam.

Preferably the detector is an elongate, fixed detector and the adjusting comprises adjusting the source unit to sweep the beam along the detector.

Preferred embodiments of the present invention will now be described, by way of example only and not in any limitative sense, with reference to the accompanying drawings, in which.

Figure 1:
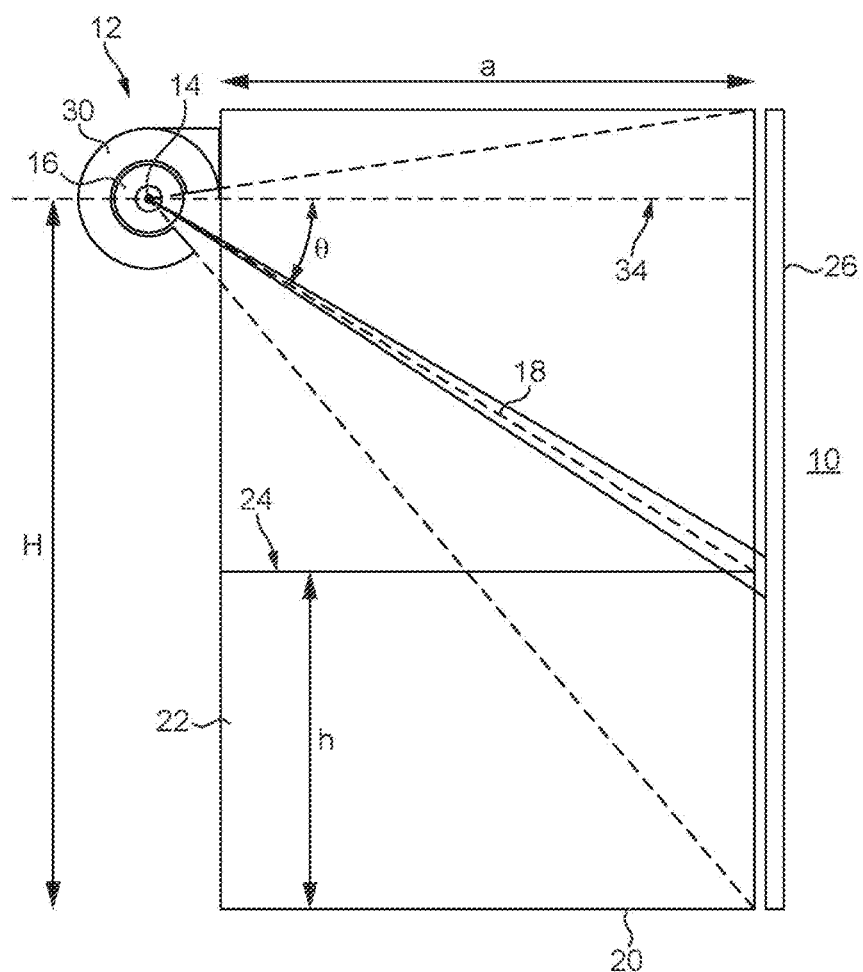
FIG. 1 shows an apparatus according to an embodiment of the invention, in use for measuring the level of a fluid in a vessel.

With reference to FIG. 1, an apparatus according to an embodiment of the invention will now be described. The apparatus 10 includes a source unit 12, comprising a source 14, in the form of a source of gamma radiation, for example Cs-137, and a collimator 16 for collimating radiation emitted by the source 14. The source unit 12 is arranged to emit a beam of radiation 18 into the interior of a vessel 20. The vessel 20 may contain a variable volume of a fluid 22, the level 24 of which is to be determined. The apparatus 10 also includes a detector 26, in the form of a plastic scintillator 26, for detecting radiation emitted by the source 14.

The source unit 12 and detector 26 are located on opposite sides of the vessel 20. The gamma radiation emitted by the source 14 is sufficiently penetrating to pass through the walls of the vessel 20.

Figure 2:
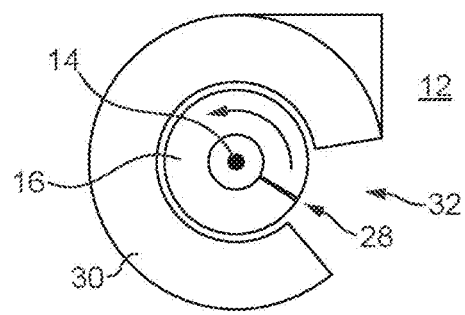
FIG. 2 shows a source unit for the apparatus of FIG. 1.

FIG. 2 shows a schematic illustration of the source unit 12. A collimator 16 surrounds the source 14 and includes a slot for collimating radiation emitted by the source 14 to a narrow beam 18. The collimator 16 is arranged for rotation, the axis of rotation being centered on the source 14. Rotation of the collimator causes the angle θ of the beam of radiation 18 to vary with respect to horizontal. A servo motor, gearbox and encoder system (not shown) allows control and reporting of the angle θ at which the beam 18 is pointing. Further shielding 30 around the source 14 prevents radiation being emitted in directions other than into the interior of the vessel 20 via a slot 32 in the shielding 30.

Varying the angle θ of the beam 18 causes the beam 18 to scan across different parts of the detector 26. Depending on the level 24 of the fluid 22 within the vessel 20, the beam 18 will sometimes propagate to the detector 26 without passing through the fluid 22, whereas sometimes it will pass through the fluid 22 before reaching the detector 26. This changes the amount of attenuation of the beam. By recording data corresponding to an amount of radiation received at the detector 26 as a function of angle θ of the beam 18, it is possible to determine the fluid level 24 of fluid 22 in the vessel 20, as will be described below.

The beam angle θ may be varied continuously or in a stepped manner. The amount of radiation detected at the detector 26 may be recorded as an amount of radiation (e.g. a number of counts) received in a specified time period, or as a rate of detection of radiation (e.g. a count rate) at the detector 26.

Figure 3:
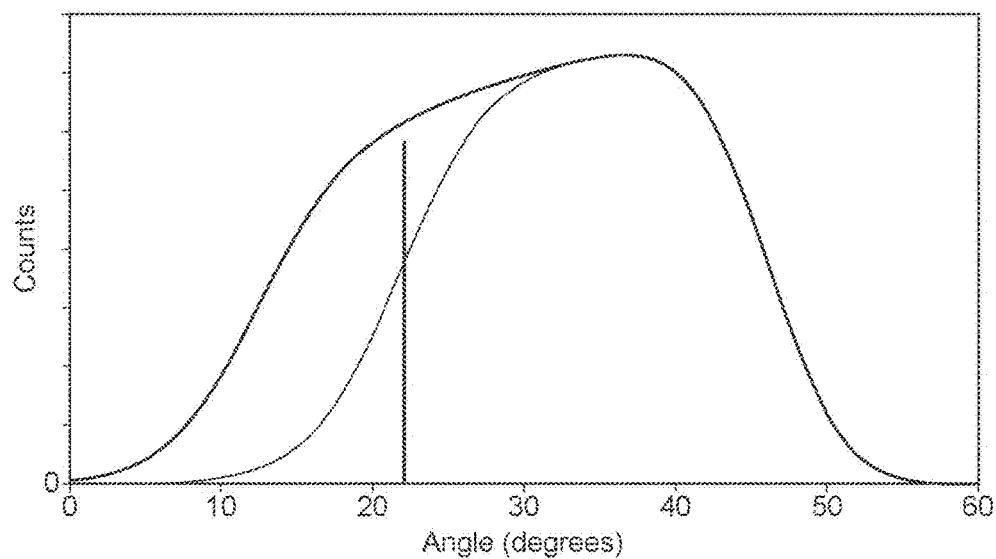
FIG. 3 illustrates the variation of data corresponding to an amount of radiation detected at the detector as a function of angle of the beam of radiation.

FIG. 3 illustrates the change in the amount of radiation detected at the detector (as a number of counts) against the angle of the beam, according to a computer model of the apparatus 10, for two different levels 24 of the fluid. The beam angle is indicated in degrees over a 60° measurement range, in which the beam 18 is swept from an angle at which it points to a position slightly lower than the detector 26 (left-hand side of FIG. 3), up to an angle at which it points to a position just higher than the detector 26 (right-hand side of FIG. 3). Note that, in FIG. 3, the beam angle is not indicated with respect to the horizontal 34. In this example, when the beam 18 passes through the fluid 22, it is almost completely attenuated before reaching the detector 26, so the detector 26 records a low count rate when the beam 18 is detected by the lowermost, submerged part of the detector 26. As the beam 18 is swept upwards towards the horizontal position 34, the number of counts recorded at the detector 26 increases as the path length of the beam 18 through the fluid 22 (and hence the attenuation of the beam 18) decreases. The count rate continues to increase as the beam emerges from the fluid. Eventually, the beam 18 no longer traverses the fluid 22 and impinges on a part of the detector 26 which is not submerged in the fluid 22. As the beam 18 is scanned higher still, towards a horizontal position 34 and beyond, the number of counts recorded decreases due to the beam 18 leaving the detection range of the detector 26 and/or being blocked by the upper wall of the vessel 20.

Of the two curves shown in FIG. 3, the right-hand curve corresponds to a higher fluid level 24. For a higher fluid level 24, the beam 18 scans out of the fluid 22 later and hence the rising edge of the curve occurs later. The falling edge of the curve occurs at the same point however, as it is fixed by the geometry of the vessel 20 and detector 26. On the right-hand curve of FIG. 3, a vertical bar indicates the angle $\theta_{max}$ corresponding to the maximum slope of the curve, i.e. the maximum rate of change of radiation with angle of the beam 18, as the beam 18 crosses the level 24 of the fluid 22 in the vessel 20. It has been found that this maximum rate of change occurs at the angle $\theta_{max}$ at which the centre of the beam 18 just emerges from the fluid 22, as illustrated in FIG. 1. By determining the angle $\theta_{max}$ at which the maximum rate of change occurs, it is therefore possible to calculate the position of the fluid level 24. With reference to FIG. 1, the distance S of the fluid level 24 below the beam 18 in its horizontal position 34 is given by S=a tan $\theta_{max}$, where a is the separation between the axis of rotation of the collimator (which, in this embodiment, coincides with the source 14) and the detector 26, and $\theta_{max}$ is the angle of the beam 18, relative to horizontal 34, corresponding to the maximum rate of change of the amount of detected radiation with angle of the beam 18. The depth h of fluid 22 in the vessel 20 is thus given by h=H−S=H−a tan $\theta_{max}$, where H is the height of the source 14 above the bottom of the vessel 20.

Because the position of the fluid level 24 is determined by a relative increase in counts, rather than relying on an absolute count value, the measurement is resilient both to changes in background radiation and to changes in build-up of deposits on the interior walls of the vessel 20. In addition, the apparatus is also unaffected by pressure changes within the vessel 20. Importantly, the apparatus does not require a tank-cycling calibration. The determination of the fluid level 24 simply requires knowledge of the dimensions of the vessel 20 and the positions of the source unit 12 and detector 26.

Figure 4:
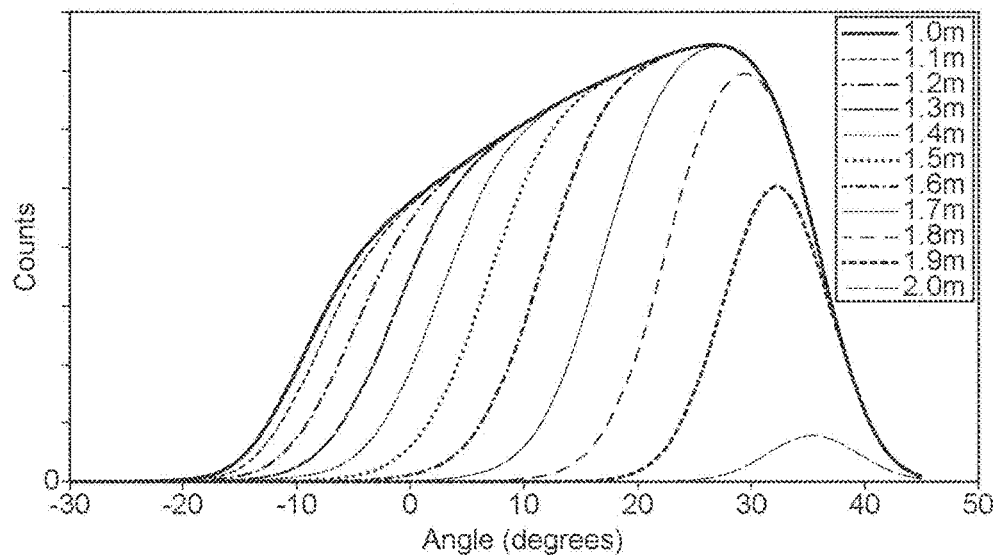
FIG. 4 shows the variation of an amount of radiation detected at the detector as a function of angle of the beam of radiation, according to a computer model of an apparatus according to an embodiment of the present invention.

FIG. 4 shows the results of a simulation for measurements of the fluid level 24 in a vessel 20 in the form of a steel tank 2 meters tall and 1 meter wide. In the simulation, the beam 18 has a width of approximately 20° at the detector 26, and the fluid depth ranges from 1 meter (broadest curve) to 2 meters (narrowest curve). The simulation confirms that the position of the fluid level 24 corresponds to a beam angle $\theta_{max}$ for which the change in the number of counts is a maximum as the beam enters or leaves the fluid 22.

Figure 5:
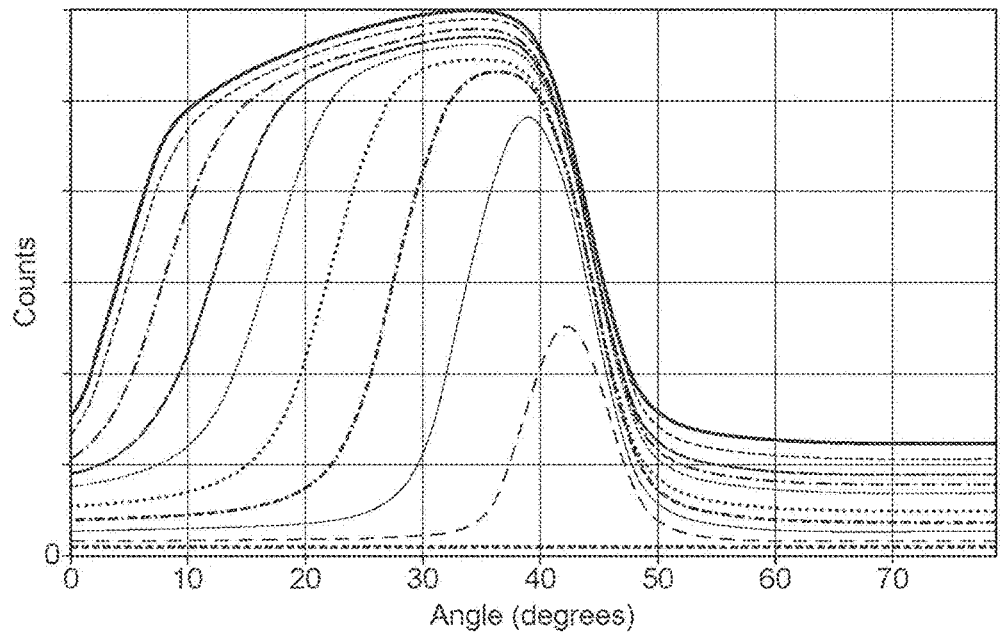
FIG. 5 shows data corresponding to an amount of radiation detected at the detector as a function of angle of the beam of radiation, measured using an apparatus according to an embodiment of the present invention.

FIG. 5 shows actual data recorded as counts versus beam angle for various levels of water in a steel tank which is approximately 2 meters deep and 1 meter wide, using a 1.11 GBq Cs-137 source, and allowing radiation counts to accumulate for 2 seconds at each beam angle θ. The fluid depth ranges from approximately 1 meter (broadest curve) to approximately 2 meters (narrowest curve). The changing position of the rising edge of the curve with fluid depth is clearly seen. The source unit 12 is located at 1.95 meters above the bottom of the tank 20, so fluid levels above this height cannot be accurately determined. For a fluid level of approximately 2.2 meters, a flat curve was measured, since this corresponds to the tank being full of water, and the detector 26 being fully submerged. The drop in the peak count rate with increasing fluid depth is due to the width of the radiation beam 18 at the detector 26 being wider than the gap between the water level 24 and the top of the detector.

The background radiation level is clearly visible as the flat parts of the curves towards the right-hand side of FIG. 5. This background level decreases with increasing depth of water, as the tank included a dip pipe containing small check sources. At low water levels, more of these check sources were exposed to the detector without attenuation by the water, resulting in a higher background level. Despite the variation in the amount of radiation from the check sources demonstrating that the apparatus is resilient to a fluctuating background.

Figure 6:
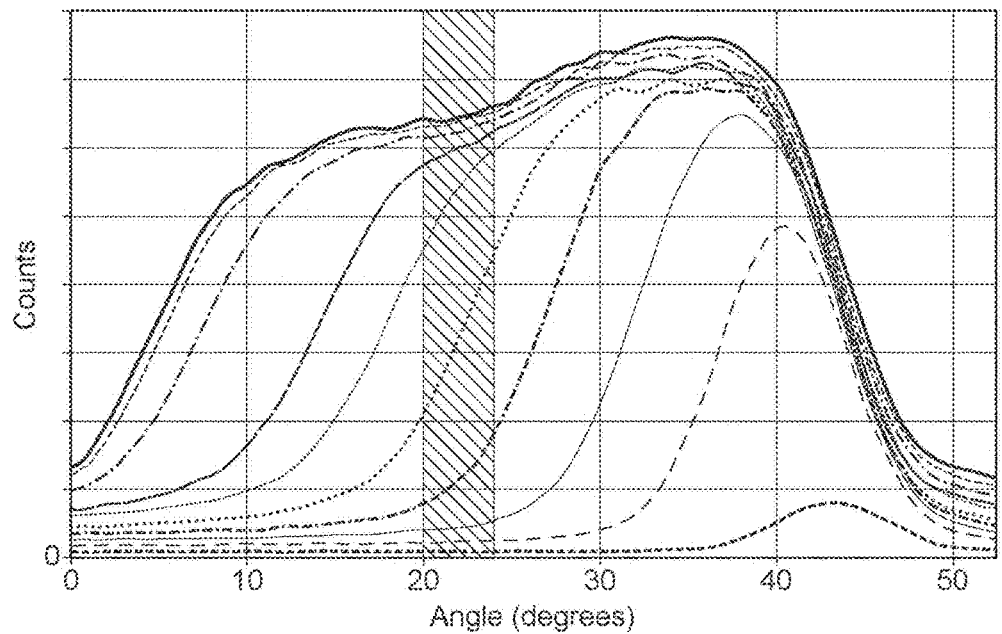
FIG. 6 shows data corresponding to an amount of radiation detected at the detector as a function of angle of the beam of radiation, measured using an apparatus according to an embodiment of the present invention, the apparatus being modified to simulate build-up of deposits on the walls of the vessel.
Figure 7:
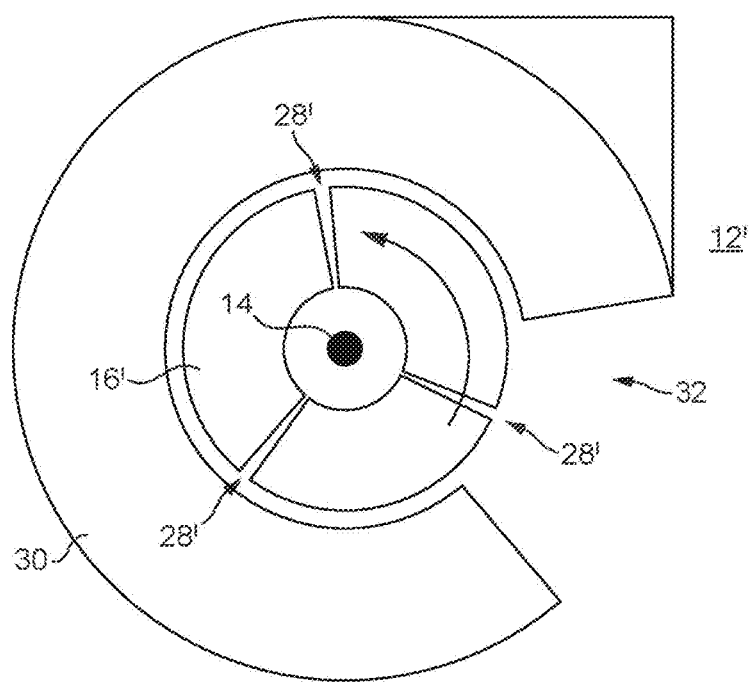
FIG. 7 shows an alternative source unit for the apparatus of FIG. 1.

FIG. 6 shows a set of measurements corresponding to those presented in FIG. 5, but differing in that the vessel 20 was modified to simulate a concentration of build-up of deposits on the walls of the tank 20 by placing a 3 mm thick, 13 cm tall sheet of lead in front of the detector 26 at a height of 1.44 meters up the tank 20 (equivalent to approximately 5-15 cm of wet build-up). Part of the graph of FIG. 7 is shaded to indicate the beam angles at which the radiation beam 18 impinged on the lead sheet. The radiation counts recorded at each beam angle were allowed to accumulate for 1 second. A dip in counts is observed where the beam passes over the build-up as shown in FIG. 6. However, this did not affect the ability of the apparatus to accurately determine the fluid levels 24 from the rising edges of the curves. The apparatus could even be adapted to calculate the position and thickness of the build-up based on the relative decrease in recorded counts when scanning over it.

In practice, background count rates may exceed 1,000,000 counts per second. Although the background level (visible in FIG. 5) can be measured accurately and subtracted, it is also necessary to take into account the $\sqrt{n}$ noise associated with a large background count rate n. This is important for maintaining accuracy of measurement, particularly when using a small source. Three methods for reducing the noise on the signal were modeled: time-averaging, Gaussian filtering, and Fourier filtering. In the time-averaging technique, the beam 18 was swept multiple times across the detector 26, following which the data were averaged together point by point. The Gaussian filtering technique used a wide Gaussian filter to smooth the data. Using the Fourier technique, data collected over four sweeps of the beam 18 across the detector 26 were combined to produce a periodic function from which a Fourier spectrum was obtained. High-frequency Poisson noise was removed using a low-pass filter before back-transforming the filtered Fourier spectrum to produce smooth curves from which the fluid level was determined. The Gaussian and Fourier filtering techniques were seen to produce similar improvements, but the Gaussian filtering technique may be preferred for obtaining rapid measurements of fluid level since it requires only one full sweep of the beam 18 across the detector 26. The Gaussian filtering technique was able to provide an accuracy better than +/−2 cm at a signal-to-noise ratio of 10.

The angle $\theta_{max}$ of the beam 18 corresponding to the maximum rate of change of detected radiation with angle of the beam 18 may be found by fitting a smooth function through the data and evaluating the function over the entire measurement range. The angle $\theta_{max}$ corresponding to the maximum gradient of the fitted curve is then used to determine the fluid level 24 as described above. This method also reduces the effect of the noise on the determined fluid level. Any smooth function adjustable to the shape of the data can be used, for example a Weibull function or a polynomial function. The function may be fitted using standard techniques such as least squares regression.

There is a compromise to be made between update interval (count time), source size and background resilience. By increasing the data collection time at each angle and/or by increasing the source size (to increase the signal count rate at the detector 26), the apparatus is able to perform well at higher background count rates. However, it is desirable to minimize the data collection time in order to provide more frequent measurement updates, and to use smaller radiation sources if possible.

For example, when using a 370 MBq source on a 1 meter wide tank (giving a dose of approximately 5 µSv at the detector) and a six-beam collimator rotating at 1 Hz, it is necessary to collect data for 18 seconds in order to provide a new measurement with an accuracy of ±2 cm or better in the presence of background radiation levels of around 50 μSv. That is, when operating with background radiation level of around 50 μSv, a step change in fluid level would require 18 seconds of data collection before the apparatus could report the new fluid level with an accuracy of ±2 cm. The apparatus may nonetheless update the fluid level measurement each second, by storing 18 seconds worth of data, and discarding the oldest second's worth of data each time the next second's worth of data is added. Of course, when the apparatus is operated in an environment in which the background radiation level is much lower, the update interval can be reduced as the signal to noise ratio is much lower. The update interval can be altered dynamically since the background radiation level is measured whenever the radiation beam 18 is not shining on the detector 26, as discussed above with reference to FIG. 1. Under conditions of low background radiation, the fluid level measurement can be updated each second at the desired accuracy.

In order to increase the data collection rate, the collimator may be provided with multiple slots, rather than a single slot 28 as in the embodiment described above with reference to FIGS. 1 and 2. FIG. 7 shows an embodiment of a source unit 12' in which the collimator 16' includes three slots 28', separated by approximately 120° with respect to the axis of rotation, for providing three narrow collimated beams of radiation, such that each complete rotation of the collimator 16' results in three sweeps of a radiation beam across the detector 26. In another embodiment, the collimator may include six slots for generating six beams.

In addition, the width of the slot 28 or slots 28' of the collimator 16, 16' may be selected to provide a desired width for the collimated beam 18 or beams. Increasing the width of a slot 28, 28' increases the area of the detector 26 illuminated at each beam angle θ, thereby increasing the signal to noise ratio.

The skilled person will appreciate that detectors other than the plastic scintillator described above may be used. Different types of detector may be used depending on the dose rate of radiation to be detected. In some embodiments, the detector may be segmented or formed from multiple individual detectors. This may provide additional information regarding the position of the beam 18 on the detector 26. A photomultiplier tube may be used to record detection events at the detector 26. Although the data collected has been described as a count rate, the amount of radiation detected by the detector may alternatively be recorded as a voltage or current.

The apparatus is preferable sil2 compliant (safety integrity level 2) that is to say, it detects and reports back any faults. The apparatus is able to self-diagnose and report if it has failed.

It will be appreciated by persons skilled in the art that the above embodiments have been described by way of example only, and not in any limitative sense, and that various alterations and modifications are possible without departure from the scope of the invention as defined by the appended claims.

The invention claimed is:

1. An apparatus for determining a level of a fluid within a vessel, the apparatus comprising:
a source unit for emitting a beam of radiation into the interior of the vessel, the source unit comprising a source of radiation and a collimator for collimating radiation emitted by the source to provide said beam, wherein said source unit is adjustable to vary an angle of the beam with respect to horizontal;
at least one detector for detecting radiation emitted by the source and having passed through at least a portion of the interior of the vessel; and
processing means for:
recording data corresponding to an amount of radiation detected at said at least one detector as a function of angle of the beam; and
determining the level of the fluid, based on a variation of said data with the angle of the beam.

2. An apparatus according to claim 1, wherein the source unit is adjustable by rotating the collimator to vary an angle of the beam.

3. An apparatus according to claim 2, wherein the apparatus comprises a motor for driving rotation of the collimator.

4. An apparatus according to claim 2, wherein the collimator comprises more than one slot for collimating radiation emitted by the source.

5. An apparatus according to claim 2, wherein the axis of rotation of the collimator is centered substantially on the source.

6. An apparatus according to claim 3, wherein the motor comprises an encoder for indicating an angle of the beam.

7. An apparatus according to claim 3, wherein the collimator comprises more than one slot for collimating radiation emitted by the source.

8. An apparatus according to claim 3, wherein the axis of rotation of the collimator is centered substantially on the source.

9. An apparatus according to claim 6, wherein the collimator comprises more than one slot for collimating radiation emitted by the source.

10. An apparatus according to claim 1, wherein the collimator comprises more than one slot for collimating radiation emitted by the source.

11. An apparatus according to claim 1, wherein the axis of rotation of the collimator is centered substantially on the source.

12. An apparatus according to claim 1, wherein the detector comprises a plastic scintillator.

13. An apparatus according to claim 1, wherein the level of the fluid is determined based on an angle of the beam with respect to the horizontal corresponding to a maximum rate of change of said data with the angle of the beam.

14. An apparatus according to claim 13, wherein said maximum rate of change of said data is a maximum rate of change as the beam enters or leaves the fluid.

15. An apparatus according to claim 13, wherein the level of the fluid is determined to be located below the position of the beam in its horizontal configuration by a distance equal to a tan $\theta_{max}$, where a is the separation between the axis of rotation of the collimator and the detector, and $\theta_{max}$ is the angle of the beam relative to horizontal corresponding to said maximum rate of change of said data with angle of the beam.

16. An apparatus according to claim 1, wherein said processing means is configured to:
(i) average the data over repeated measurements prior to determining the level of the fluid;
(ii) apply a Gaussian filter to the data prior to determining the level of the fluid;
(iii) apply a Fourier filter to the data prior to determining the level of the fluid; and/or
(iv) fit a smooth function to the data, prior to determining the level of the fluid based on an angle of the beam with respect to the horizontal corresponding to a maximum rate of change of said fitted function with the angle of the beam.

17. An apparatus according to claim 1, wherein the angle of the beam is stepped through a plurality of values.

18. An apparatus according to claim 1, wherein the angle of the beam is varied continuously.

19. An apparatus according to claim 1, wherein the source of radiation comprises a source of gamma radiation.

20. A method for determining a level of a fluid within a vessel, the method comprising the following steps:
   providing a source unit for emitting a beam of radiation into the interior of a vessel, the source unit comprising a source of radiation and a collimator for collimating radiation emitted by the source to provide said beam;
   providing a detector for detecting radiation emitted by the source and having passed through at least a portion of the interior of the vessel;
   adjusting said source unit to vary an angle of the beam with respect to horizontal;
   recording data corresponding to an amount of radiation detected at the detector as a function of angle of the beam; and
   determining the level of the fluid based on a variation of said data with the angle of the beam.

* * * * *